Dec. 15, 1964     O. E. HERMANNS     3,161,063

TIRE BALANCING

Original Filed Sept. 2, 1958     2 Sheets-Sheet 1

INVENTOR.
OTTO E. HERMANNS
BY C. E. Tripp
ATTY.

Dec. 15, 1964

O. E. HERMANNS 3,161,063

TIRE BALANCING

Original Filed Sept. 2, 1958

INVENTOR.
OTTO E. HERMANNS

United States Patent Office 3,161,063
Patented Dec. 15, 1964

3,161,063
TIRE BALANCING
Otto E. Hermanns, Akron, Ohio, assignor to The B. F. Goodrich Company, New York, N.Y., a corporation of New York
Continuation of application Ser. No. 758,254, Sept. 2, 1958. This application Jan. 7, 1963, Ser. No. 249,916
1 Claim. (Cl. 73—483)

This application is a continuation of my copending application Serial No. 758,254, filed September 2, 1958, now abandoned.

This invention relates to the art of measuring static unbalance of pneumatic tires. After tires are cured in their molds they are removed from the molds and sent to the tire finishing department, one of the functions of this department being to determine the static unbalance of tires so that correcting balance material of the proper weight can be applied to the interior of the tire at the crown at the proper location. In order to make possible this determination, various manufacturers have for many years supplied in the open market, platform type balancing machines on which the tires were mounted and which included a spherical bubble type of level for indicating both the amount and angularity of unbalance. I have found that the prior art has failed to clearly recognize or even understand the importance of two conditions that have existed in the use of previously available apparatus which are best explained in connection with the description of this invention.

In accordance with the preferred embodiment of this invention, the tire to be tested is mounted on a rim and inflated. The rim is mounted on a pivot and the rim and its mounting structure are normally horizontal. Pendulum means depend from the rim mounting structure so that the center of gravity of the pivotally mounted assembly is below the pivot point, lying on an axis that is perpendicular to the plane of the rim. A critical feature of the apparatus of this invention is that the pivot point lies in the mid-plane of the rim that mounts the tire beads, so that the pivot point lies substantially in a plane passing through the mid-plane of a tire mounted on the rim. This construction has advantages that were heretofore not recognized. Most important, a change in tire mass; that is, a change in the section or weight of the tire having a given bead diameter will not change the calibration of the apparatus. On the other hand, for example, if the mid-plane of the tire is disposed above the pivot point, as the tire section or size (or the weight) of the tire is increased, the mass of the tire will neutralize more and more of the pendulum mass and may even offset it completely so that the device will become unstable and inoperative; or if the mid-plane of the tire is below the pivot point, as the tire size is increased the sensitivity will decrease and a given amount of off-balance will cause a reduced inclination of the assembly. Thus, with such an offset design a balancing machine in which the level or other inclination measuring device is calibrated for one size or weight of tire, will go out of calibration when another tire of more or less weight is fitted to the same rim.

Another, but less serious result of having the tire mid-plane displaced from the horizontal plane through the pivot point is that the calibration of the level or indicating device is more complex, even if tire weight remains unchanged.

Figure 1:
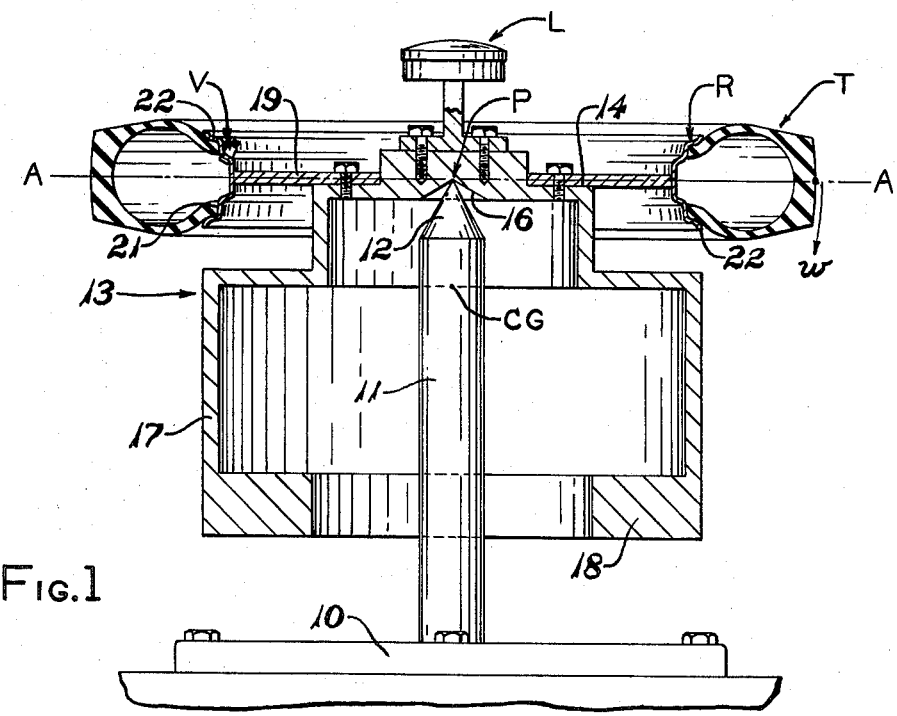
FIG. 1 shows the preferred embodiment of the invention.

Referring to FIG. 1, there is a base 10 supporting a vertical post 11 that terminates in a conical pivot portion 12. A combined counter-balance and rim mounting structure 13 is provided having a planar surface 14 to which is attached a tire mounting rim R by means of a disc 19. The mounting member 13 is formed with a conical recess 16 that establishes a pivot point P which lies in the mid-plane A—A of the rim R which plane passes substantially through the center of mass of a tire T mounted on the rim. Pendulum means are provided on structure 13 to position the center of gravity of the assembly below the pivot point as indicated at CG so that the apparatus will be stable. In the form of the invention shown, the pendulum means comprises a skirt 17 terminating in a flange 18. Centered on the vertical axis of structure 13 is a spherical bubble type level L of well-known, conventional construction, common in this art. The graduated face of the level gives a reading indicating both the amount of tire unbalance either in ounces, or inch-ounces as desired, and the angular location of the point of unbalance. The rim R has bead seats 21 and retaining flanges 22 so that when a tire is mounted on a rim it can be inflated by means of a standard inflation valve V or by other means thereby maintaining the center of the mass of the tire under test in the plane A—A, regardless of the sectional dimensions of the tire and regardless of the mass of the tire. Since the heaviest portion of the tire occurs at the tread because the tread rubber is quite thick to give wearing qualities to the tire, it has been found practical to assume that any unbalance in the tire occurs at the tread, and it is also sufficiently accurate to assume that the center of unbalance lies substantially in the mid-plane A—A of the tire.

It is true that as tire section increases the radius of application of the unbalanced mass $w$ increases somewhat, in both applicant's and the prior devices but applicant's device has the advantage mentioned in that by mounting the tire on the rim on plane A—A no change in tire dimensions or in the number of carcass plies will change the calibration of the apparatus which will always give the same reading for a given moment of unbalanced mass at the periphery of the tire. Regardless of tire section, if the angle of tilt measuring device such as a level is calibrated to read inch-ounces, the reading can be divided by the radius of the crown of the tire in inches to determine the number of ounces of correcting material which should be applied.

Figure 2:
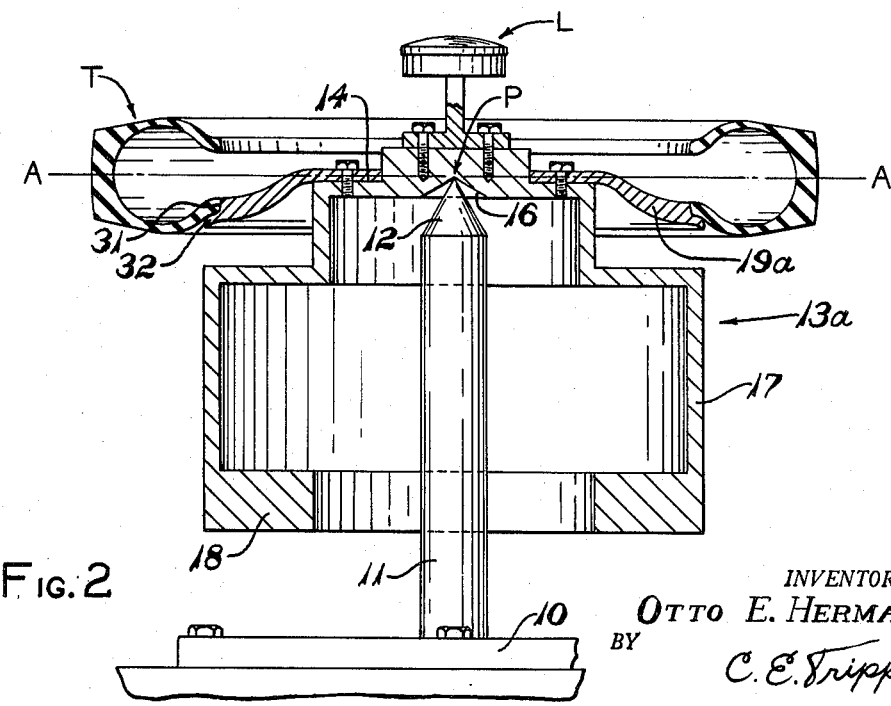
FIG. 2 shows another form of the invention which is not quite as perfect as that of FIG. 1 for all tire sizes.

FIG. 2 illustrates another form of the invention which is not quite as perfect as that of FIG. 1 over a range of tire sections. Here the supporting platform 13A mounts a disc 19A having a bead seat 31 and a supporting flange 32 for the lower bead of the tire T. Normally the center of mass of the tire is on the plane A—A passing through the pivot point P. However, in this case changes in tire width or section will have some small effect on the resultant center of gravity of the tire and pendulum assembly but the effect will be small, and changes in the basic weight of the tire (6 plies as compared to 4 plies, for example) have no effect. The effect of this mounting is minimized by mounting the tire on a bead rather than by laying it on its side because within a range of tires fitted to a given rim or mounting flange the variation in the molded width of the tire across the beads is much less than the total variation in tire sectional width. Thus although I prefer to employ the rim and inflate the tire as shown in FIG. 1, I may, in some cases, particularly where a small range of freshly molded tires is being tested, use the mounting of FIG. 2, but in either case pivot point P lies substantially in the plane A—A passing through the center of mass of the tire.

Figure 3:
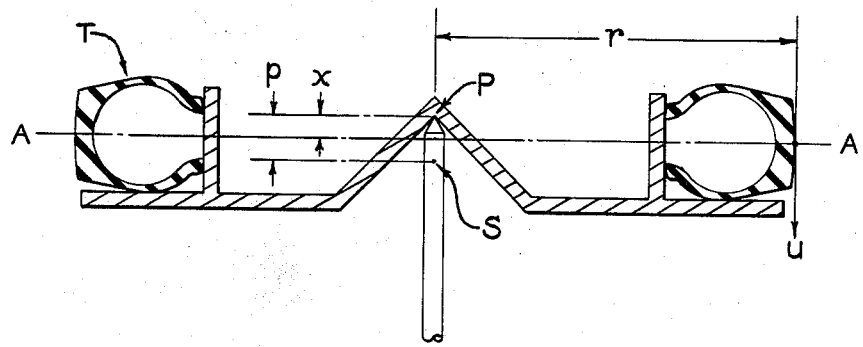
FIG. 3 is a diagram illustrating the geometric relationships of the location of the tire and of the tire support to the pivot point.
Figure 4:
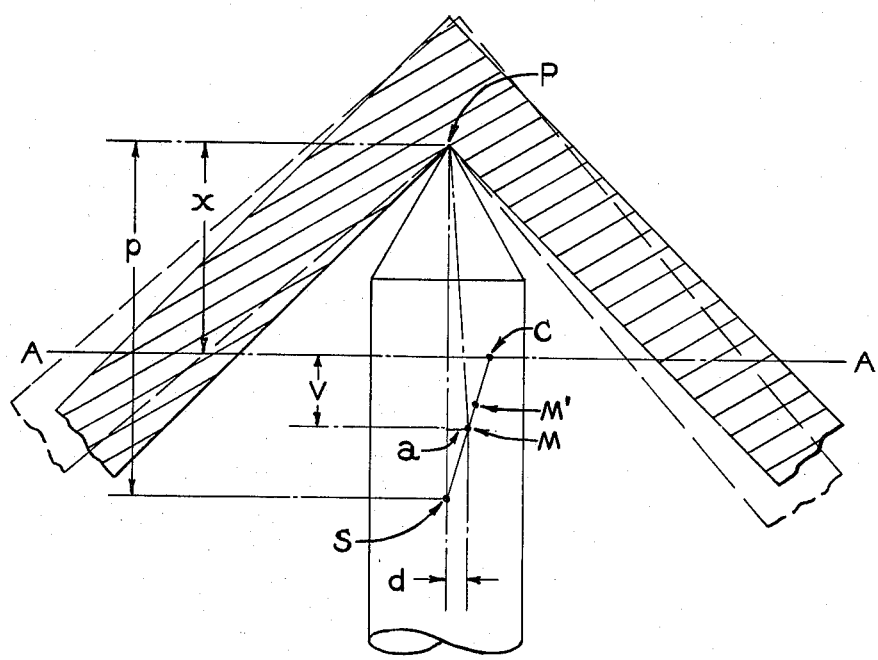
FIG. 4 is a greatly enlarged diagram of the central part of FIG. 3.

Referring to FIGS. 3 and 4, the diagrams represent the general relationships between tire and support in a balancing apparatus, for any chosen height of the tire with respect to the pivot. In these diagrams:

S is the mass of the support (the center of mass being designated by the same letter S)
p is the pendulum arm of S, unloaded
T is the mass of a perfect tire
u is the mass of unbalance of a tire
r is the radius of the unbalanced mass $u$
C is the center of mass of tire T plus $u$
M is the center of mass of the assembly S plus T plus $u$
x is the distance between pivot P and the central plane A—A of the tire
V is the vertical distance between C and M
a is the equilibrium angle of tilt
d is the lateral displacement of the combined center of gravity M from the axis, before tilting.

The dashed lines in FIG. 4 indicate the equilibrium position of the tire support, after the unbalance has caused M to move through angle $a$ to a position directly below pivot P.

It is well known that the location of a combined center of mass depends on the magnitude of the separate masses. Thus if the tire and the support are equal in mass, the combined center of mass M will be half way between C and S. If the tire is twice as heavy as the support, the combined center of mass M' will be one-third of the distance from C to S.

The lateral displacement $d$ of the center of gravity M of the assembly of S and T because of presence of unbalanced mass $u$ at radius $r$ is given by the conventional formula $$d(S+T) = (r-d)u$$

from which $$d = \frac{ur}{S+T+u}$$

Similarly, the vertical shift V of the center of gravity of the tire resulting from assembly with the support is given by the analogous formula $$V = \frac{S(p-x)}{S+T+u}$$

The angle of tilt is then determined by the relationship $$\tan a = \frac{d}{V+x}$$

Combining these, we obtain $$\tan a = \frac{\frac{ur}{S+T+u}}{\frac{S(p-x)}{S+T+u}+x}$$

$$= \frac{ur}{Sp+Tx+ux}$$

Since the tangent of a small angle is almost proportional to the angle, it is evident that the farther the central plane A—A of the tire is below the pivot P (that is, the larger the value of $x$) the larger will be the denominator of the fraction, and the smaller the angle of tilt produced by a particular degree of unbalance. In addition, the mass T of the tire appears in the denominator so that the amount of tilt will be different for each different weight of tire.

If the central plane A—A of the tire is above the pivot P, $x$ in these formulas will be negative. Consequently, the higher the tire is mounted, the smaller will be the denominator and the larger the angle of tilt. Again, the value of T will affect the amount of tilt. Finally, when the sum of $Tx$ and $ux$ is as large as $Sp$, the apparatus will become unstable and inoperative.

It is only when $x$ is zero—that is, when the central plane A—A of the tire passes through the pivot P—that the tilt becomes proportional to unbalance, because S and $p$ are design factors built into the machine, so that when $x$ is zero $1/Sp$ can be designated as a constant K, and $$\tan a = Kur$$

This means that the machine with the pivot located in the central plane of the tire, once calibrated, will indicate accurately the amount of unbalance of any size or weight of tire.

The criticality of these relationships has heretofore been ignored, as evidenced by the prior art and by machines sold by the trade, so that applicant's device is the first to divorce tire mass from apparatus calibration.

Having completed a description of two embodiments of my invention so that those skilled in the art may practice the same, I claim:

A method for measuring the magnitude of a mass causing static imbalance of a pneumatic tire independently of the total mass of the tire, comprising providing a tire-supporting tool for receiving a pneumatic tire in a horizontal position, the tool being itself horizontally balanced on a single pivot point and having a tire counterbalancing portion arranged so that the combined mass center of the support and said counterbalancing portion, with or without a tire thereon, lies below said pivot point; placing a tire horizontally on said supporting tool and locating the tire with its beads concentric of the pivot point of the supporting tool and further locating the tire so that the geometric midplane of the tire intersects said pivot point, allowing the tire to tilt freely relative to the horizonal about said pivot point in response to an unbalanced mass in the tire whereby the tilt angle is a function of the unbalanced mass of the tire and is independent of the total mass of the tire, and sensing the angle of inclination to the horizontal assumed by said tire resulting from an unbalanced mass therein as a measure of the unbalanced mass of the tire.

References Cited by the Examiner
UNITED STATES PATENTS

| | | | |
|---|---|---|---|
| 2,265,897 | 12/41 | De Ghetto | 73—483 |
| 2,270,657 | 1/42 | Kraft | 73—485 |
| 2,298,656 | 10/42 | Smith | 73—459 |
| 2,947,175 | 8/60 | King | 73—483 |
| 2,979,958 | 4/61 | Kennedy | 73—483 |

RICHARD C. QUEISSER, *Primary Examiner.*

JAMES J. GILL, *Examiner.*